United States Patent [19]
Martz

[11] Patent Number: 5,941,195
[45] Date of Patent: *Aug. 24, 1999

[54] ANIMAL CARRIER

[75] Inventor: Gayle Martz, New York, N.Y.

[73] Assignee: Gayle Martz, Inc., New York, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/924,979

[22] Filed: Sep. 8, 1997

[51] Int. Cl.$^6$ ..................................................... A01K 1/03
[52] U.S. Cl. ........................ 119/497; 190/112; 190/123; 383/100
[58] Field of Search ..................................... 119/482, 496, 119/497, 498, 769, 771; 190/108, 109, 112, 115, 123, 122; 383/100, 102, 117

[56] References Cited

U.S. PATENT DOCUMENTS

| | | | |
|---|---|---|---|
| 398,541 | 2/1889 | Roemer | 190/122 |
| 2,025,101 | 12/1935 | Halpin | 190/41 |
| 2,481,565 | 9/1949 | Boretz | 190/51 |
| 2,597,194 | 5/1952 | Sholl | 190/41 |
| 2,665,728 | 1/1954 | Hyman | 150/28 |
| 3,117,607 | 1/1964 | Siegel | 150/34 |
| 3,850,144 | 11/1974 | Springer et al. | 119/497 |
| 4,171,011 | 10/1979 | Kopin | 150/34 |
| 4,220,119 | 9/1980 | Albright | 119/497 |
| 4,236,615 | 12/1980 | Ginat | 190/52 |
| 4,378,866 | 4/1983 | Pelavin | 190/52 |
| 4,805,749 | 2/1989 | Gerch | 190/111 |
| 4,830,154 | 5/1989 | Gerch et al. | 190/109 X |
| 5,170,745 | 12/1992 | Burdette, Jr. | 119/497 |
| 5,228,547 | 7/1993 | Yoo | 190/109 X |
| 5,265,719 | 11/1993 | Wand | 206/223 |
| 5,413,199 | 5/1995 | Clement | 383/117 X |
| 5,660,476 | 8/1997 | DeCoster | 190/108 X |
| 5,671,698 | 9/1997 | Farrugia | 119/497 |
| 5,699,886 | 12/1997 | Latshaw | 190/108 |
| 5,762,170 | 6/1998 | Shyr et al. | 190/109 |
| 5,788,032 | 8/1998 | Krulik | 190/108 |
| 5,810,227 | 9/1998 | Jorgensen | 224/413 |

*Primary Examiner*—Michael J. Carone
*Assistant Examiner*—James S. Bergin
*Attorney, Agent, or Firm*—Abelman, Frayne & Schwab

[57] ABSTRACT

A portable animal carrier is disclosed which permits the transportation of a small animal, such as a cat or dog, in the passenger compartment of an airplane, by securely and safely containing the animal, but permitting placement below the airplane seat. In addition to providing manual carrying of the portable animal carrier, a supplemental strap is provided which may be used to either accommodate the insertion of a pull out handle from a wheeled article of luggage, to retain the portable animal carrier on top of the wheeled article of luggage, or insertion of an automobile safety strap to safely retain the portable animal carrier on an automobile seat.

12 Claims, 6 Drawing Sheets

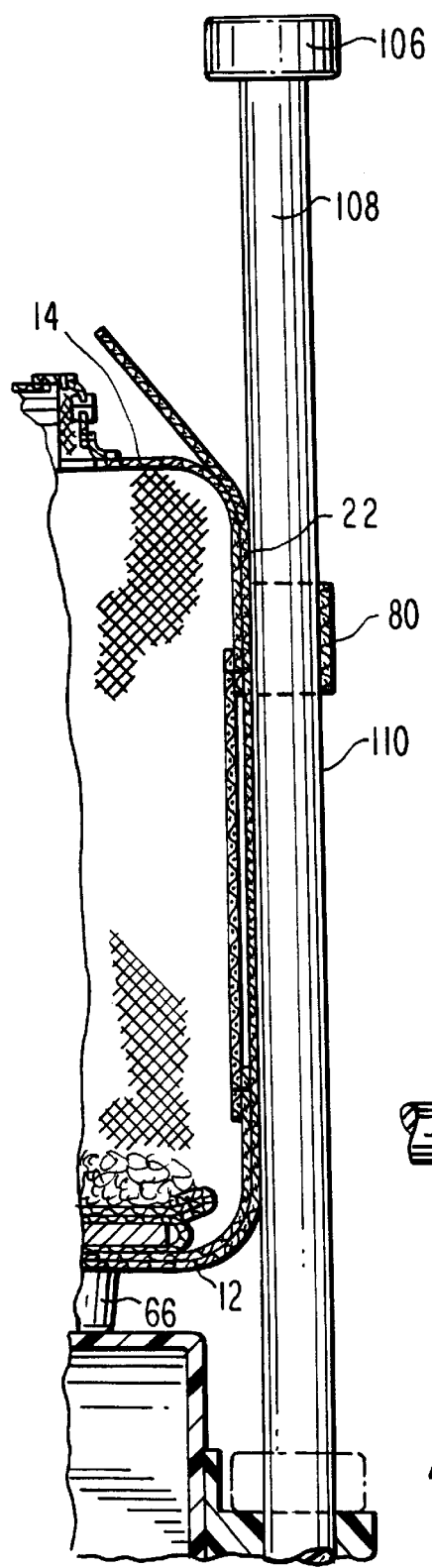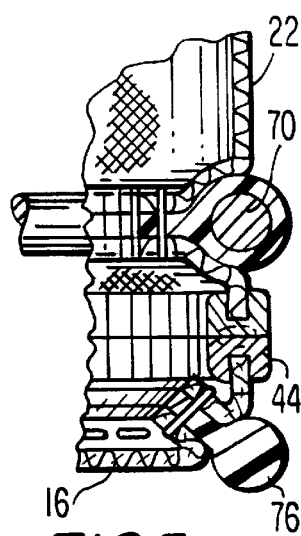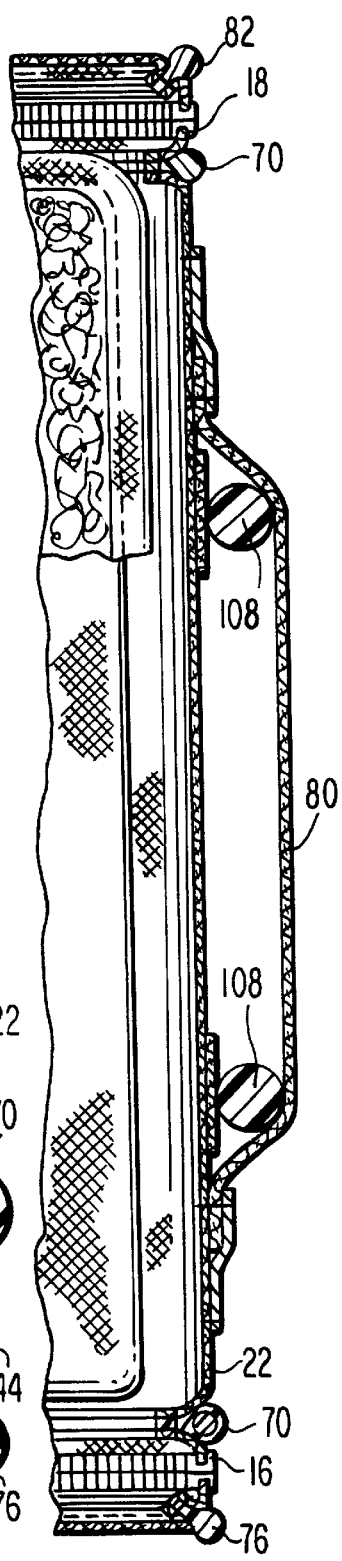

ANIMAL CARRIER

FIELD OF THE INVENTION

The present invention relates generally to a portable animal carrier which permits the safe and humane transport of an animal, such as a cat or dog, on a common carrier. When used on an airplane, the animal carrier is of a size which can safely accommodate a cat or dog, and may be safely stowed below an airplane seat. The animal carrier preferably also includes a supplemental strap for safely securing the animal carrier in either an automobile or on the top of a wheeled article of luggage.

BACKGROUND OF THE INVENTION

It is known to provide a portable animal carrier which is of a suitable size, and securely constructed, to obtain airline approval for passage within the main carrier cabin. Such a portable animal carrier contains an enclosure including appropriately connected bottom, top, end, front, and rear walls, with at least one of the walls including an area formed of mesh material for providing appropriate ventilation to the interior of the enclosure. At least one of the walls includes a selectively openable closure means, such as a zippered panel, which provides a sufficiently large opening for the convenient insertion and removal of the animal from within the interior volume of the enclosure. In order to facilitate manual carrying of the portable animal carrier, a carrier strap means is typically secured to appropriate locations, and extends above the top wall. Such strap means may include both a hand tote strap and a shoulder strap, so as to provide a versatility of totable options.

While primarily intended for transporting a cat or dog in an approved manner within an aircraft passenger cabin, it is also desirable to safely and conveniently transport the animal within the carrier while the traveler is in the passenger terminal, and within an automobile vehicle, en route to or from the airport. The present invention provides a supplemental strap which is suitably placed and configured to either secure the portable animal carrier on top of a wheeled article of luggage, or on an automobile seat.

SUMMARY OF THE INVENTION

In accordance with the present invention, at least one of the rear or front walls of the portable animal carrier includes a supplemental strap. The opposed ends of the supplemental strap are secured along the front or rear wall, with an intermediate free section of the strap being spaced from the wall. The intermediate section is of a predetermined length and spacing with respect to the wall so that it can readily accommodate the insertion of a pull out handle from a wheeled article of luggage, of the type which is typically used by travelers for transporting personal items within the airport terminal, and when boarding the airplane, is then placed in the airplane storage compartment above the traveler's seat. When the traveler is moving through the airport, he or she may typically be carrying several articles in addition to the wheeled carrier, which would make it inconvenient to separately carry the portable animal carrier, either by hand or shoulder straps. In accordance with the present invention, the portable animal carrier may be placed on the top wall of a wheeled article of luggage, with the insertion of the pull out handle between the intermediate portion of the supplemental strap and carrier wall serving to safely retain the portable carrier on the wheeled article of luggage, with this assembly then being conveniently wheeled into the airplane, to the user's seat.

In accordance with another advantageous feature of the present invention, the supplemental strap also permits the engagement of an automobile safety strap through its intermediate section when the portable animal carrier is placed on an automotive seat. Thus, the portable animal carrier will be safely maintained by the automotive safety strap to protect the animal in the event of sudden stops or accidents.

As a further feature of the present invention, access to the enclosure for inserting or removing the animal can be provided either through an end wall or top of the portable animal carrier. To achieve this, both the top, and at least one of the end walls, may be selectively opened and closed, by a suitable closure means, which may typically be a zipper.

A rigidizing frame, typically formed of steel, is preferably provided about the perimeter of at least one of the ends of the carrier. The rigidizing frame is preferably pivoted to the bottom wall of the portable animal carrier such that the end walls may be folded towards the bottom wall, with the portable animal carrier being folded into a compact storage condition during periods of non-use.

Accordingly, it is a primary object of the present invention to provide a portable animal carrier, intended for airplane passenger compartment use, which may also be safely transported on top of a wheeled article of luggage or within an automobile.

A further object of the present invention is that it provides such a portable animal carrier which includes a supplemental strap, suitably located and configured to readily permit the insertion of either the pull out handle of a wheeled article of luggage or an automobile safety strap.

Another object of the present invention is to provide a portable animal carrier which may be stowed beneath an airplane seat while the animal is contained therein, and may also be safely retained on the top wall of a wheeled article of luggage during movement within an airport passenger terminal.

Yet another object of the present invention is it provides such a portable animal carrier which accommodates the insertion of an automobile safety strap for safely retaining the portable animal carrier on the automobile seat during automobile movement.

The above as well as other objects and advantages of the present invention will become apparent upon consideration of the following drawings and description with respect to a preferred embodiment of the present invention.

BRIEF DESCRIPTION OF THE DRAWINGS

FIG. 3 is a cross sectional view along lines 3—3 as shown in FIG. 1A and looking in the direction of the arrows.

FIG. 4 is a cross sectional view along lines 4—4 as shown in FIG. 1A and looking in the direction of the arrows.

FIG. 5 is a cross sectional view along lines 5—5 as shown in FIG. 1A and looking in the direction of the arrows.

DETAILED DESCRIPTION

Figure 1:
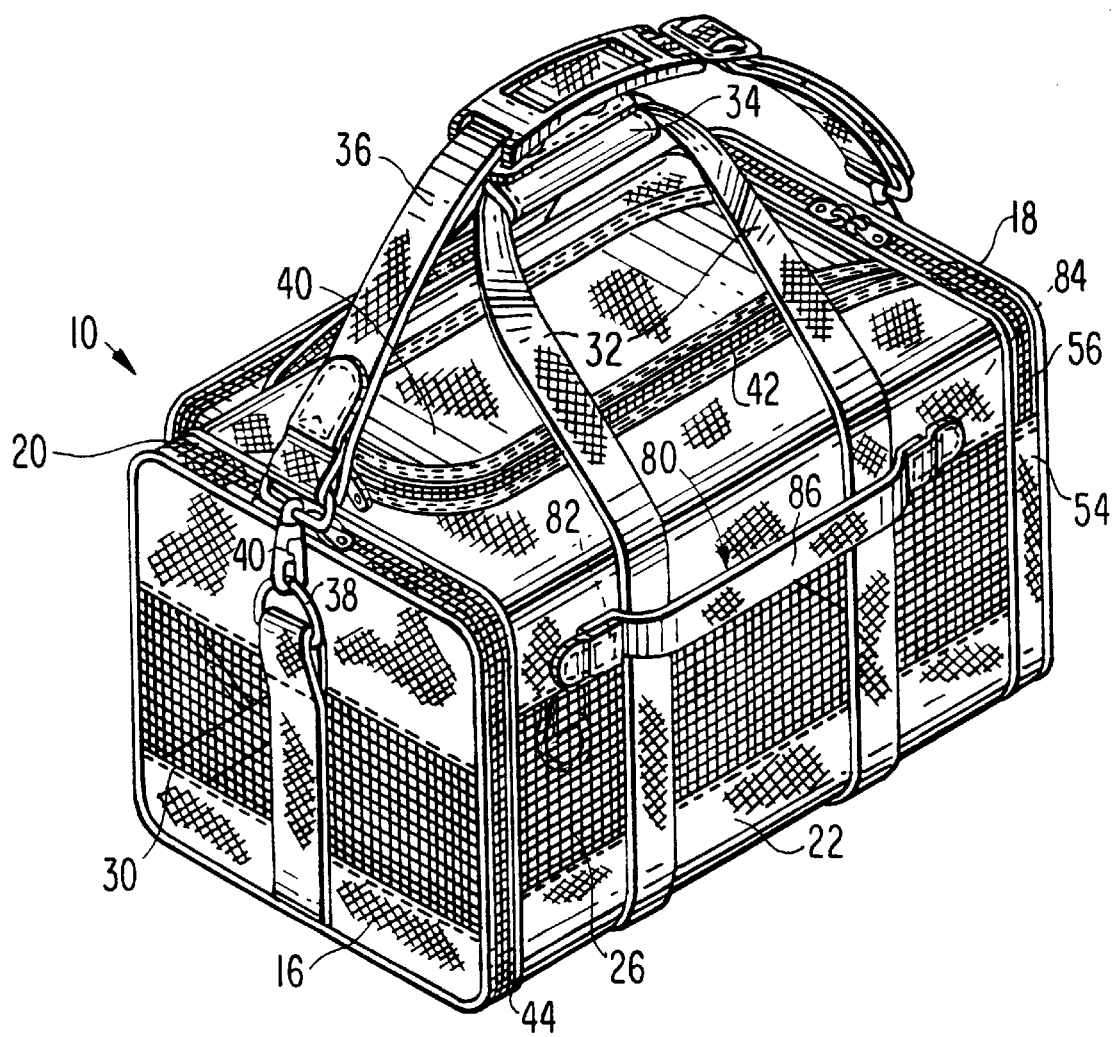
FIG. 1 is a perspective view of the portable animal carrier.

Reference is initially made to FIGS. 1, 1A, and 2–6. The portable animal carrier 10 includes bottom wall 12, top wall 14, opposed end walls 16, 18, front wall 20, and rear wall 22. These walls combinedly define a generally rectilinear interior volume, which is of a suitable size for the reception of a cat or small dog, and can be comfortably retained below an airline seat. Typically, the portable animal carrier may be between 18 to 20 inches long, 10½ to 11½ inches high, and 11 to 11¾ inches wide. It should be constructed of appropriate rugged materials utilized for luggage, such as quilted nylon, vinyl, other reinforced textile fabrics, or leather.

At least one, and preferably more than one, of the walls includes an area formed of mesh material for providing ventilation to the interior of the enclosure. Such mesh material inserts are shown as 26 along the rear wall 22, 28 along the front wall 20, and 30 along end wall 16. To facilitate manual carrying of the portable animal carrier, two carrier strap means are preferably provided. These includes straps 32, which are connected to the opposed front and rear walls (20, 22), extend over the top wall 14, and are connected together by a manual grasping member 34. Strap 36 may be removably connected to ring connectors 38, at the opposite ends 16, 18, to provide a shoulder strap, in the well known manner. When strap 36 is removed it can also serve as a leash, with spring loaded connector 40 at one of its ends engaging the loop connector (not shown) of a conventional animal collar.

At least one of the walls includes a selectively openable closure means, to provide a sufficiently large opening for the insertion and removal of an animal from within the interior volume of portable animal carrier 10. Advantageously two such panels are shown as top panel 40 having a U-shaped perimeter zipper 42, and end 16 which can be completely opened by its perimeter zipper 44. Thus, the animal may be inserted or removed from the enclosure through either the top or an end section. Further, while the animal is in the enclosure, the top panel 40 may be opened to permit the animal to lift its head out of the enclosure, while the rest of its body is still within the enclosure.

Exterior compartments are preferably provided to include travel essentials, such as veterinary papers, snacks or small toys for the animals. The exterior compartments are shown as compartment 50 along the front wall which may be accessed by zipper 52, and compartment 54 along end wall 15 which may be accessed by zipper 56.

The bottom of the enclosure includes a separate reinforced panel 60 which may preferably include a smooth vinyl outer layer for ease of cleansing. One side is preferably pivoted at 62 (see FIG. 6) to further facilitate the cleaning thereof, by providing access to the undersurface 63. For additional animal comfort, a soft washable and removable liner 64, which may be formed of faux lambskin is preferably also provided. Protective foot elements 66 are located in proximity to the corners of bottom wall 12. The foot elements 66, which may be formed of plastic, may be secured to the bottom wall by rivets 67, which extend through apertures 68 within the bottom wall.

Figure 6:
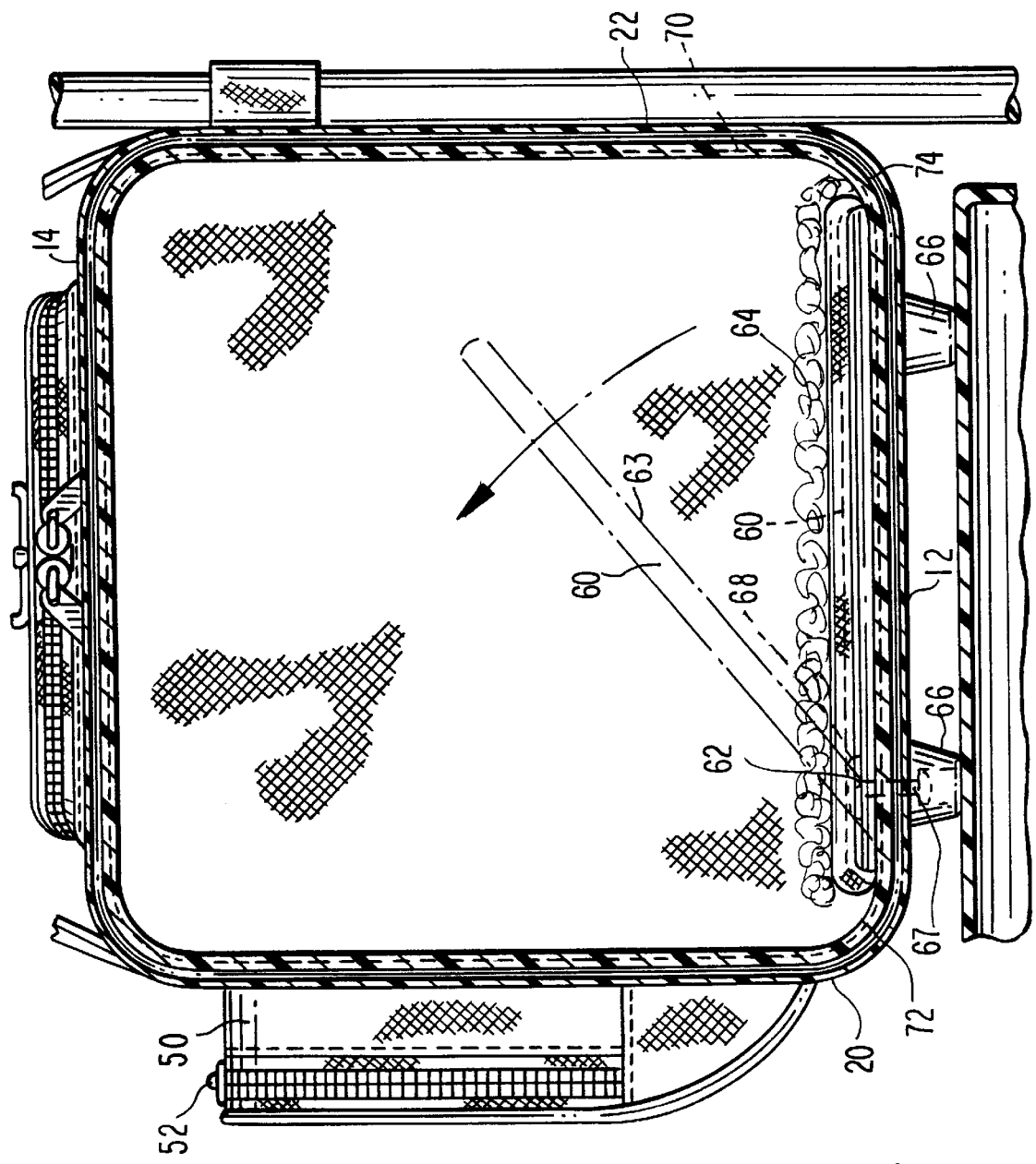
FIG. 6 is a cross sectional view along lines 6—6 as shown in FIG. 2 and looking in the direction of the arrows.

To provide for further reinforcement of the portable animal carrier, and to maintain the condition shown in FIG. 1, a rectangular rigidizing frame 70, which may typically be formed of steel, is provided about the perimeter of at least one of the ends, such as 16, as best shown in FIGS. 5 and 6. The rigid frame 70 is pivoted with respect to the bottom wall 12 about its corner junctions 72, 74. This permits the end wall 16 to be moved towards an overlying condition (not shown) with respect to the bottom wall 12. The opposite end wall 18 may be similarly pivoted towards a generally overlying condition with respect to bottom wall 12, enabling the pet carrier to be folded into a flattened storage condition. To permit such compacting of the portable animal carrier 12, to the storage condition, the side walls, and opposed ends include flexible piping 70, 76, 82 (as best shown in FIG. 4) which may typically be formed of a plastic material.

In accordance with the present invention, a supplemental strap 80 is secured to at least one of the longer walls, such as the rear wall 22. The opposed ends 82, 84 of the supplemental strap are secured to the rear wall, as by stitching. The intermediate section 86 will be loosely spaced from the exterior surface of the rear wall 22. The supplemental strap 80 may serve a dual function, as shown in FIGS. 1A and 1B.

Figure 1A:
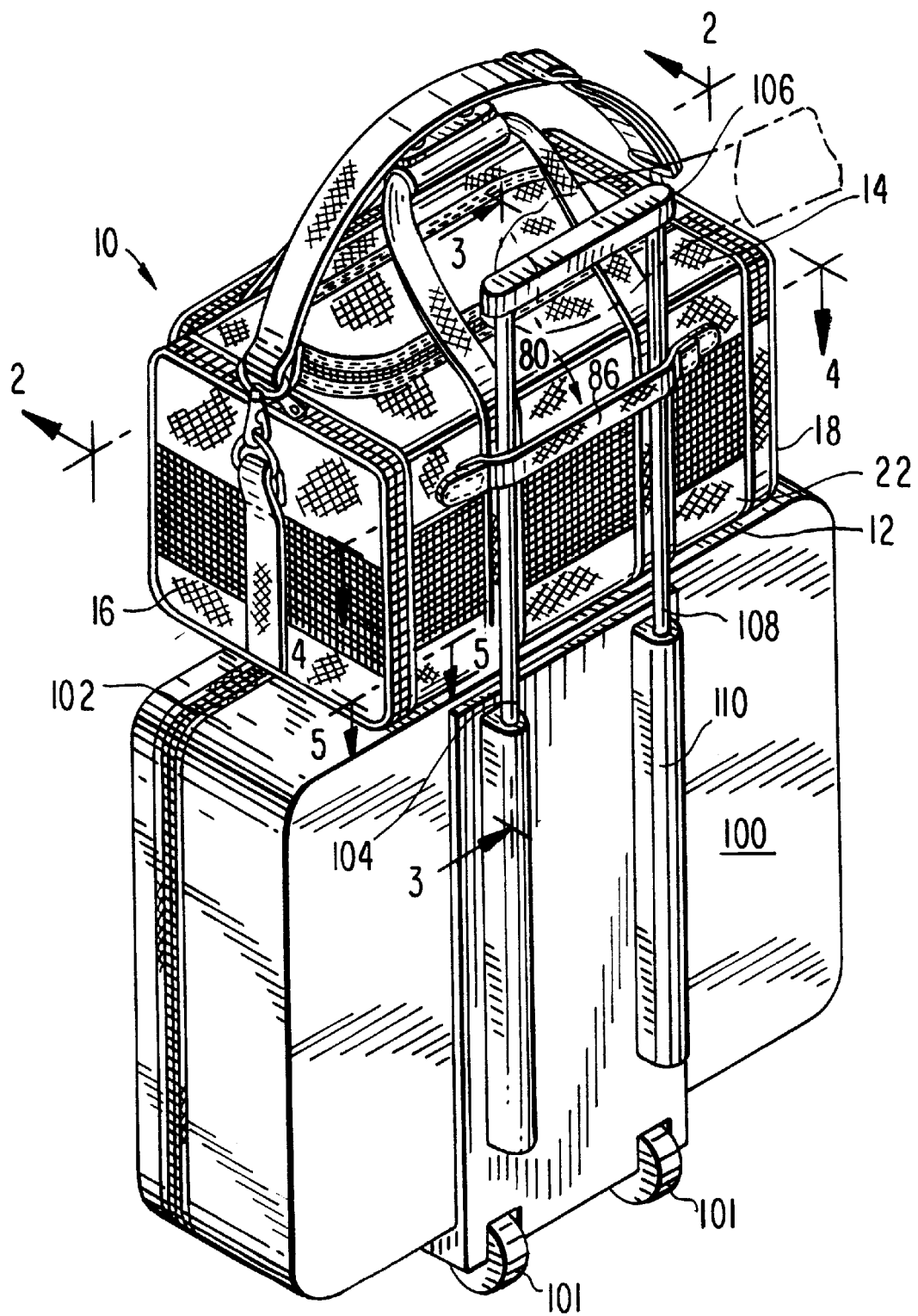
FIG. 1A is a perspective view showing the portable animal carrier placed upon, and safely secured to, the top wall of a wheeled article of luggage.

In FIG. 1A, the portable animal carrier 10 is placed on the top surface 102 of a wheeled article of luggage 100, of the type which is typically used by a traveler within an airport terminal for carrying personal items, taken aboard the aircraft cabin, and then stored in the overhead compartment. The wheeled article of luggage 100 has wheels 101 and a pull out retractable handle 106 which typically includes a pair of rods 108, which may be reciprocally stored within guide tubes 110. The intermediate section 86 of the supplemental strap is of a predetermined length and spaced from the exterior surface of rear wall 22 to accommodate the insertion of typical pull out handles 106. Accordingly, when the pull out handle 106 is placed through the intermediate portion 86 of the supplemental strap 80, the supplemental strap retains the portable animal carrier 10 on the top surface 102 of the wheeled article of luggage 100, thereby permitting the traveler to conveniently and safely roll same as a unit, as shown by the dashed hand and arm, in FIG. 1A.

Figure 1B:
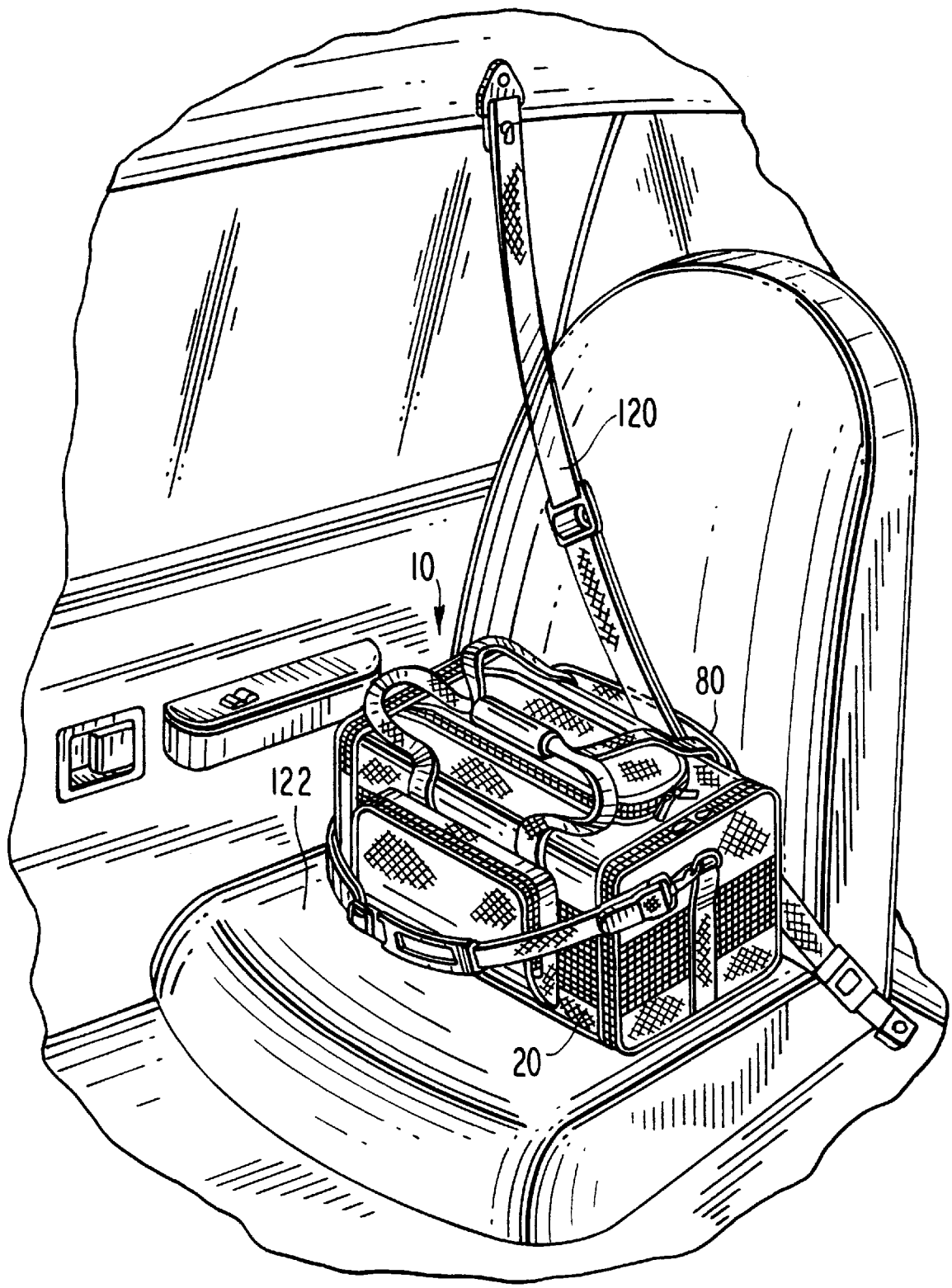
FIG. 1B is a perspective view showing the portable animal carrier placed upon and safely maintained on an automobile seat.
Figure 2:
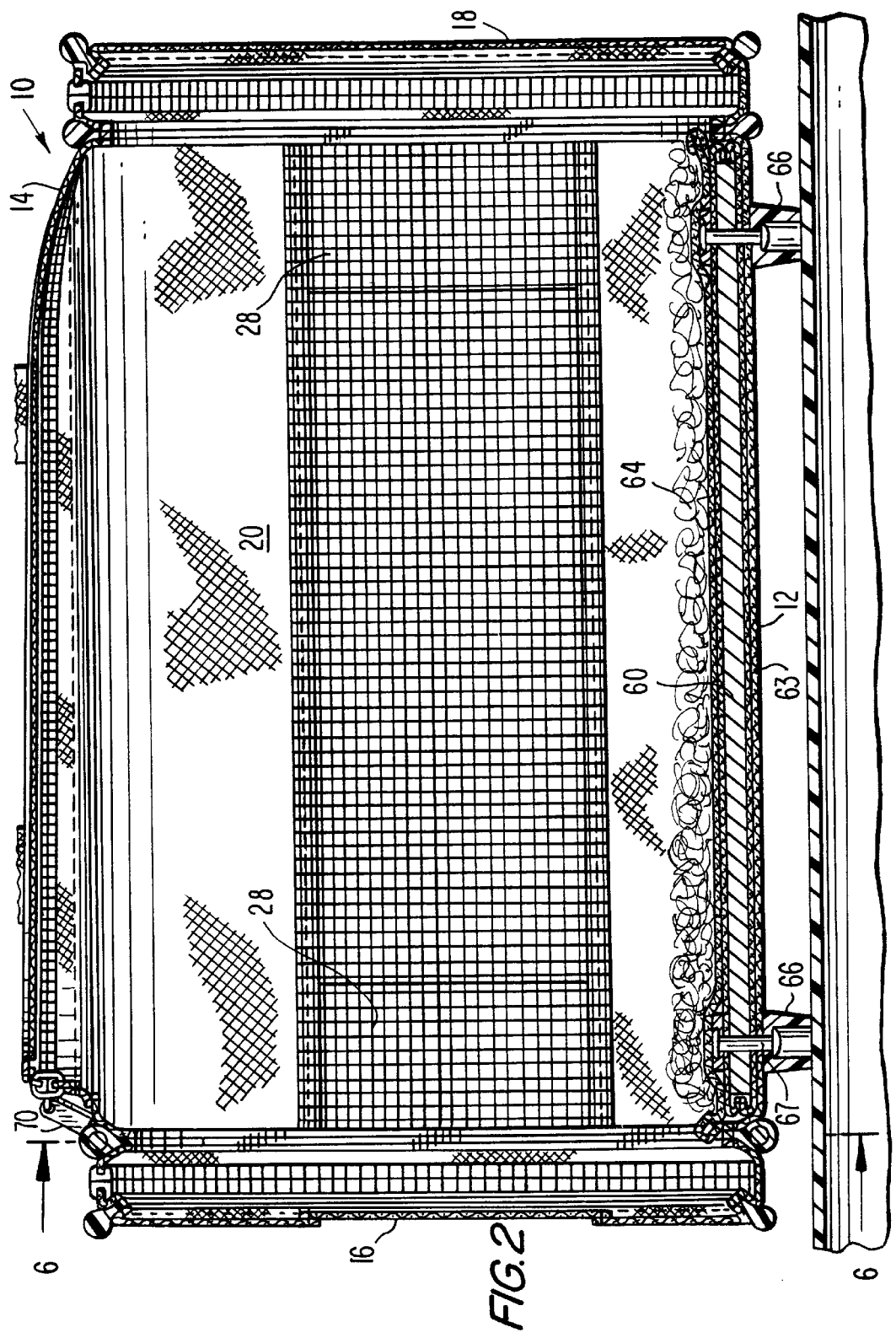
FIG. 2 is a cross sectional view along lines 2—2 as shown in FIG. 1A and looking in the direction of the arrows.

As shown in FIG. 1B the supplemental strap 80 may also accommodate a conventional automobile safety strap 120, in order to safely retain the portable animal carrier 10 upon the seat 122 of an automobile.

While the invention has been described with reference to a preferred embodiment, this embodiment is merely exemplary and is not intended to be limiting or to represent all aspects of the invention. For example, the supplemental strap may also be used to safely retain the portable animal carrier on a foldable wheeled carrier of the type used in passenger terminals to hold luggage. The scope of the invention, therefore, shall be defined solely by the following claims.

What is claimed:

1. A portable animal carrier comprising:
   an enclosure including bottom and top walls, first and second end walls, and rear and front walls connected to define a generally rectilinear interior section;
   at least one of said walls including an area formed of mesh material for providing ventilation to the interior section of said enclosure;
   at least one of said walls defining a first opening communicating with the interior section of said enclosure and being of shape and dimensions sufficient to facilitate insertion therethrough of an animal into the interior section and removal therefrom, said opening being associated with a first closure panel having corresponding shape and dimensions, whereby said closure panel is movable between a first position which exposes the interior section of said enclosure through said opening, and a second position which closes said opening;
   a carrier strap member secured to said enclosure and extending above said top wall a sufficient extent for carrying said enclosure; and a supplemental strap secured to one of said rear or front walls, said supplemental strap including opposed end portions secured to said one wall, and an intermediate section;

said intermediate section of said supplemental strap being of a predetermined length and being spaced from said one wall sufficient to accommodate the insertion of an automobile safety strap, whereby said enclosure may be placed on an automobile seat, and the engagement of the automobile safety strap and said supplemental strap retains said enclosure on the automobile seat.

2. A portable animal carrier according to claim 1, wherein said one wall to which said supplemental strap is secured is said rear wall.

3. A portable animal carrier according to claim 1, further including:

a rigidizing support frame extending about at least a portion of the perimeter of at least one end wall, said frame being pivotally connected with respect to said bottom wall to permit movement of said frame towards said bottom wall to fold said enclosure into a compact storage condition in which both of said end walls are moved towards an overlying relationship with respect to said bottom wall.

4. A portable animal carrier according to claim 1, wherein said supplemental strap extends generally parallel to said top wall.

5. A portable animal carrier according to claim 1, wherein at least one of said end walls comprises a second closure panel being selectively at least partially separable from said connected walls along at least a portion of the perimeter thereof sufficient to permit insertion of an animal into the interior section and removal therefrom.

6. A portable animal carrier according to claim 5, wherein each of said first and second closure panels includes a zipper extending about the separable portion of the perimeter thereof.

7. A portable animal carrier according to claim 5, further comprising a first closed fastener for said first closure panel and a second closure fastener for said second closure panel.

8. A portable animal carrier according to claim 7, wherein each of said closure fasteners is a zipper.

9. A portable animal carrier comprising:

an enclosure including bottom and top walls, first and second end walls, and rear and front walls connected to define a generally rectilinear interior section;

at least one of said walls including an area formed of mesh material for providing ventilation to the interior section of said enclosure;

at least one of said walls defining a first opening communicating with the interior section of said enclosure and being of shape and dimensions sufficient to facilitate insertion of an animal into the interior section and removal therefrom, said opening being associated with a first closure panel having corresponding shape and dimensions, whereby said first closure panel is movable between a first position which exposes the interior section of said enclosure through said opening, and a second position which closes said opening;

at least one of said end walls being selectively at least partially separable from said connected walls sufficient to permit insertion of an animal into the interior section and removal therefrom;

a carrier strap member secured to said enclosure and extending above said top wall a sufficient extent for carrying said enclosure; and a supplemental strap secured to one of said rear or front walls, and extending generally parallel to said top wall, said supplemental strap including opposed end portions secured to said one wall, and an intermediate section spaced from said one wall;

said intermediate section of said supplemental strap being at a predetermined location on said one wall and of predetermined length and spacing from said one wall sufficient to receive both (i) a pull out handle of a wheeled article of luggage when said enclosure is placed on the top of the wheeled article of luggage to retain said enclosure on the wheeled article of luggage and (ii) the insertion of an automotive safety strap when said enclosure is placed on an automobile seat, to retain said enclosure on the automobile seat.

10. A portable animal carrier comprising:

an enclosure including bottom and top walls, first and second end walls, and rear and front walls connected to define a generally rectilinear interior section, at least one of said end wall being selectively at least partially separable from said connected walls sufficient to permit insertion of an animal into the interior portion and removal therefrom;

at least one of said walls including an area formed of mesh material for providing ventilation to the interior section of said enclosure;

at least one of said walls defining an opening communicating with the interior section of said enclosure and being of shape and dimensions sufficient to facilitate insertion therethrough of an animal into the interior section and removal therefrom, said opening being associated with a first closure panel having corresponding shape and dimensions, whereby said first closure panel is movable between a first position which exposes the interior section and a second position which closes said opening;

a carrier strap member secured to said enclosure and extending above said top wall a sufficient extent for carrying said enclosure; and a supplemental strap member secured to one of said rear or front walls, said supplemental strap including opposed end portions secured to said one wall, and an intermediate section spaced from said one wall;

said intermediate section of said supplemental strap member being of a predetermined length and being spaced from said one wall sufficient to accommodate the insertion of a pull out handle of a wheeled article of luggage, whereby said enclosure may be placed on the wheeled article of luggage, and the engagement of the pull out handle and said supplemental strap member retains said enclosure on top of the wheeled article of luggage.

11. A portable animal carrier comprising:

an enclosure including bottom and top walls, first and second end walls, and rear and front walls connected to each other to define a generally rectilinear interior section;

at least one of said rear and front walls including an area formed of mesh material for providing ventilation to the interior section;

a carrier strap member attached to at least two of said walls and extending above said top wall a sufficient extent to facilitate manual gripping thereof;

a supplemental strap secured to one of said rear or front walls, said supplemental strap including opposed end portions secured to said one wall, and an intermediate section;

said intermediate section of said supplemental strap being of a predetermined length and being spaced from said one wall sufficient to accommodate the insertion of an automobile safety strap, whereby said enclosure may be placed on an automobile seat, and the engagement of the automobile safety strap and said supplemental strap retains said enclosure on the automobile seat;

at least one of said end walls including an area formed of mesh material for providing ventilation to the interior section and being selectively at least partially separable from said connected walls and pivotable with respect thereto sufficient to permit insertion of an animal into the interior section and removal therefrom;

a closure zipper extending over the separable portions of said at least one pivotal end wall for releasably attaching said pivotal end wall to said connecting walls; and flexible piping extending at least about portions of the periphery of said walls to provide flexible support to said walls while permitting selective flexing of portions of said enclosure for storage purposes.

12. A portable animal carrier according to claim 11, wherein said top wall defines an opening communicating with the interior section of said enclosure, said opening being of shape and dimensions sufficient to facilitate insertion of an animal therethrough into the interior section and removal therefrom, said opening having a first closure panel associated therewith and of corresponding shape and dimensions, said first closure panel being movable between a first position which exposes the interior section through said opening, and a second position which closes said opening.

* * * * *